(12) United States Patent
Cui et al.

(10) Patent No.: US 9,720,218 B2
(45) Date of Patent: Aug. 1, 2017

(54) VOLUME IMAGING

(71) Applicant: Howard Hughes Medical Institute, Chevy Chase, MD (US)

(72) Inventors: Meng Cui, Ashburn, VA (US); Lingjie Kong, Ashburn, VA (US)

(73) Assignee: Howard Hughes Medical Institute, Chevy Chase, MD (US)

( * ) Notice: Subject to any disclaimer, the term of this patent is extended or adjusted under 35 U.S.C. 154(b) by 242 days.

(21) Appl. No.: 14/452,181

(22) Filed: Aug. 5, 2014

(65) Prior Publication Data
US 2015/0042992 A1 Feb. 12, 2015

Related U.S. Application Data

(60) Provisional application No. 61/887,127, filed on Oct. 4, 2013, provisional application No. 61/862,570, filed on Aug. 6, 2013.

(51) Int. Cl.
*G01J 4/00* (2006.01)
*G02B 21/00* (2006.01)
*G02B 21/36* (2006.01)

(52) U.S. Cl.
CPC ....... *G02B 21/0076* (2013.01); *G02B 21/002* (2013.01); *G02B 21/367* (2013.01); *G02B 21/0092* (2013.01)

(58) Field of Classification Search
CPC .............. G02B 21/002; G02B 21/0076; G02B 21/0092; G02B 21/367
USPC ........................................................ 356/369
See application file for complete search history.

(56) References Cited

U.S. PATENT DOCUMENTS

| 4,503,708 A * | 3/1985 | Kino ................. G01N 29/0681 73/606 |
| 6,428,171 B1 * | 8/2002 | Aoki ................. G01B 11/0608 250/559.38 |
| 7,787,674 B2 * | 8/2010 | Eichhorn .................. G06T 5/50 382/128 |
| 2003/0230710 A1 * | 12/2003 | Wolleschensky ...... G02B 26/06 250/234 |

(Continued)

OTHER PUBLICATIONS

Adams et al., "Seeded Region Growing", Correspondence, IEEE Transactions on Pattern Analysis and Machine Intelligence, vol. 16, No. 6, Jun. 1994, pp. 641-647.

(Continued)

*Primary Examiner* — Sunghee Y Gray
(74) *Attorney, Agent, or Firm* — DiBerardino McGovern IP Group LLC

(57) ABSTRACT

A system for a laser-scanning microscope includes an optical element configured to transmit light in a first direction onto a first beam path and to reflect light in a second direction to a second beam path that is different from the first beam path; a reflector on the first beam path; and a lens including a variable focal length, the lens positioned on the first beam path. The lens and reflector are positioned relative to each other to cause light transmitted by the optical element to pass through the lens a plurality of times and in a different direction each time. In some implementations, the system also can include a feedback system that receives a signal that represents an amount of focusing of the lens, and changes the focal length of the lens based on the received signal.

19 Claims, 11 Drawing Sheets

(56) References Cited

U.S. PATENT DOCUMENTS

| | | | |
|---|---|---|---|
| 2006/0034543 A1* | 2/2006 | Bacus | G02B 21/367 382/284 |
| 2006/0044648 A1 | 3/2006 | Akiyama et al. | |
| 2007/0035855 A1 | 2/2007 | Dickensheets | |
| 2007/0146869 A1* | 6/2007 | Lauer | G02B 5/005 359/368 |
| 2008/0049215 A1 | 2/2008 | Kawano et al. | |
| 2008/0088838 A1* | 4/2008 | Raicu | G01J 3/2823 356/318 |
| 2008/0266440 A1* | 10/2008 | Yazdanfar | G02B 21/244 348/340 |
| 2010/0039701 A1* | 2/2010 | Tsurumune | G01N 21/6456 359/385 |
| 2011/0072543 A1* | 3/2011 | Redford | G02B 21/002 850/21 |
| 2011/0134521 A1* | 6/2011 | Truong | G01N 21/6408 359/388 |
| 2012/0098949 A1* | 4/2012 | Knebel | G02B 21/002 348/79 |
| 2013/0027518 A1* | 1/2013 | MacKay | G02B 21/26 348/46 |
| 2013/0141782 A1 | 6/2013 | Theriault et al. | |
| 2013/0148196 A1 | 6/2013 | Arnold | |

OTHER PUBLICATIONS

Ahrens et al., "Whole-Brain Functional Imaging at Cellular Resolution Using Light-Sheet Microscopy", Nature Methods, vol. 10, No. 5, May 2013, 12 pages.

Amir et al., "Simultaneous Imaging of Multiple Focal Planes Using a Two-Photon Scanning Microscope", Optics Letters, vol. 32, No. 12, Jun. 15, 2007, pp. 1731-1733.

Azvolinsky Anna, "Breaking Ground: Creating Microscopic Lenses That Work at the Speed of Sound", Princeton Alumni Weekly, Mar. 20, 2013, 2 pages.

Botcherby et al., "Aberration-Free Three-Dimensional Multiphoton Imaging of Neuronal Activity at KHz Rates", PNAS, vol. 109, No. 8, Feb. 21, 2012, pp. 2919-2924.

Cheng et al., "Simultaneous Two-Photon Calcium Imaging at Different Depths with Spatiotemporal Multiplexing", Nature Methods, vol. 8, No. 2, Feb. 2011, 6 pages.

Chen et al., "Ultra-Sensitive Fluorescent Proteins for Imaging Neuronal Activity", HHMI Author Manuscript, Nature, vol. 499, No. 7458, Jul. 18, 2013, pp. 295-300.

Denk et al., "Two-Photon Laser Scanning Fluorescence Microscopy", American Association for the Advancement of Science, Science, vol. 248, No. 4951, Apr. 6, 1990, pp. 73-76.

Duocastella et al., "Simultaneous Imaging of Multiple Focal Planes for Three-Dimensional Microscopy Using Ultra-High-Speed Adaptive Optics", Journal of Biomedical Optics, vol. 17, No. 5, May 2012, pp. 1-3.

Fujisaki et al., "In Vivo Imaging of Treg Cells Providing Immune Privilege to the Haematopoietic Stem-Cell Niche", Nature, vol. 474, Jun. 9, 2011, 5 pages.

Germain et al., "A Decade of Imaging Cellular Motility and Interaction Dynamics in the Immune System", Science, vol. 336, No. 6089, Jun. 29, 2012, pp. 1-16.

Germain et al., "Dynamic Imaging of the Immune System: Progress, Pitfalls and Promise", Nature Review, Immunology, vol. 6, Jul. 2006, pp. 497-507.

Gobel et al., "Imaging Cellular Network Dynamics in Three Dimensions Using Fast 3d Laser Scanning", Nature Methods, vol. 4, No. 1, Jan. 2007, pp. 73-79.

Grewe et al., "Optical Probing of Neuronal Ensemble Activity", Current Opinion in Neurobiology, Science Direct, vol. 19, Oct. 2009, pp. 520-529.

Grewe et al., "High-Speed In Vivo Calcium Imaging Reveals Neuronal Network Activity with Near-Millisecond Precision", Nature Methods, vol. 7, No. 5, May 2010, 11 pages.

Katona et al., "Fast Two-Photon In Vivo Imaging With Three-Dimensional Random-Access Scanning in Large Tissue Volumes", Nature Methods, vol. 9, No. 2, Feb. 2012, 11 pages.

Kim et al., "mGRASP Enables Mapping Mammalian Synaptic Connectivity with Light Microscopy", Nature Methods, vol. 9, No. 1, Jan. 2012, 9 pages.

Kolaczkowska et al., "Neutrophil Recruitment and Function in Health and Inflammation", Nature Reviews, Immunology, vol. 13, Mar. 2013, pp. 159-175.

Lämmermann et al., "Neutrophil Swarms Require LTB4 and Integrins at Sites of Cell Death In Vivo", Nature, vol. 498, No. 7454, Jun. 20, 2013, pp. 1-16.

McLeod et al., "Multiscale Bessel Beams Generated by a Tunable Acoustic Gradient Index of Refraction Lens", Optics Letters, vol. 31, No. 21, Nov. 1, 2006, pp. 3155-3157.

Mermillod-Blondin et al., "High-Speed Varifocal Imaging with a Tunable Acoustic Gradient Index of Refraction Lens", Optics Letters, vol. 33, No. 18, Sep. 15, 2008, pp. 2146-2148.

Nimmerjahn et al., "Resting Microglial Cells Are Highly Dynamic Surveillants of Brain Parenchyma in Vivo", Science, vol. 308, May 27, 2005, pp. 1314-1318.

Olivier et al., "Two-Photon Microscopy With Simultaneous Standard and Extended Depth of Field Using a Tunable Acoustic Gradient-Index Lens", Optics Letters, vol. 34, No. 11, Jun. 1, 2009, pp. 1684-1686.

Reddy et al., "Three-Dimensional Random Access Multiphoton Microscopy for Fast Functional Imaging of Neuronal Activity", Nat. Neurosci.,vol. 11, No. 6, Jun. 2008, pp. 1-20.

Schrödel et al., "Brain-Wide 3D imaging of Neuronal Activity in Caenorhabditis elegans with Sculpted Light", Nature Methods, vol. 10, No. 10, Oct. 2013, 10 pages.

Si et al., "Fluorescence Imaging Beyond the Ballistic Regime by Ultrasound Pulse Guided Digital Phase Conjugation", Nat Photonics., vol. 6, No. 10, Oct. 1, 2012, pp. 657-661.

Tag Optics, "The Physics behind Tag Optics' Technology and the Mechanism of Action of Using Sound to Shape Light", Application Note 12-001 Physics Behind the TAG Technology, Mar. 20, 2013, pp. 1-6.

Tang et al., "Superpenetration Optical Microscopy by Iterative Multiphoton Adaptive Compensation Technique", PNAS, Apr. 18, 2012, pp. 1-6.

Theriault et al., "Revolutionizing Adaptive Optics Through Acoustics", TAG-Optics Ltd., Mid-Infrared technologies for Health and Environment, Oct. 4, 2010, 15 pages.

* cited by examiner

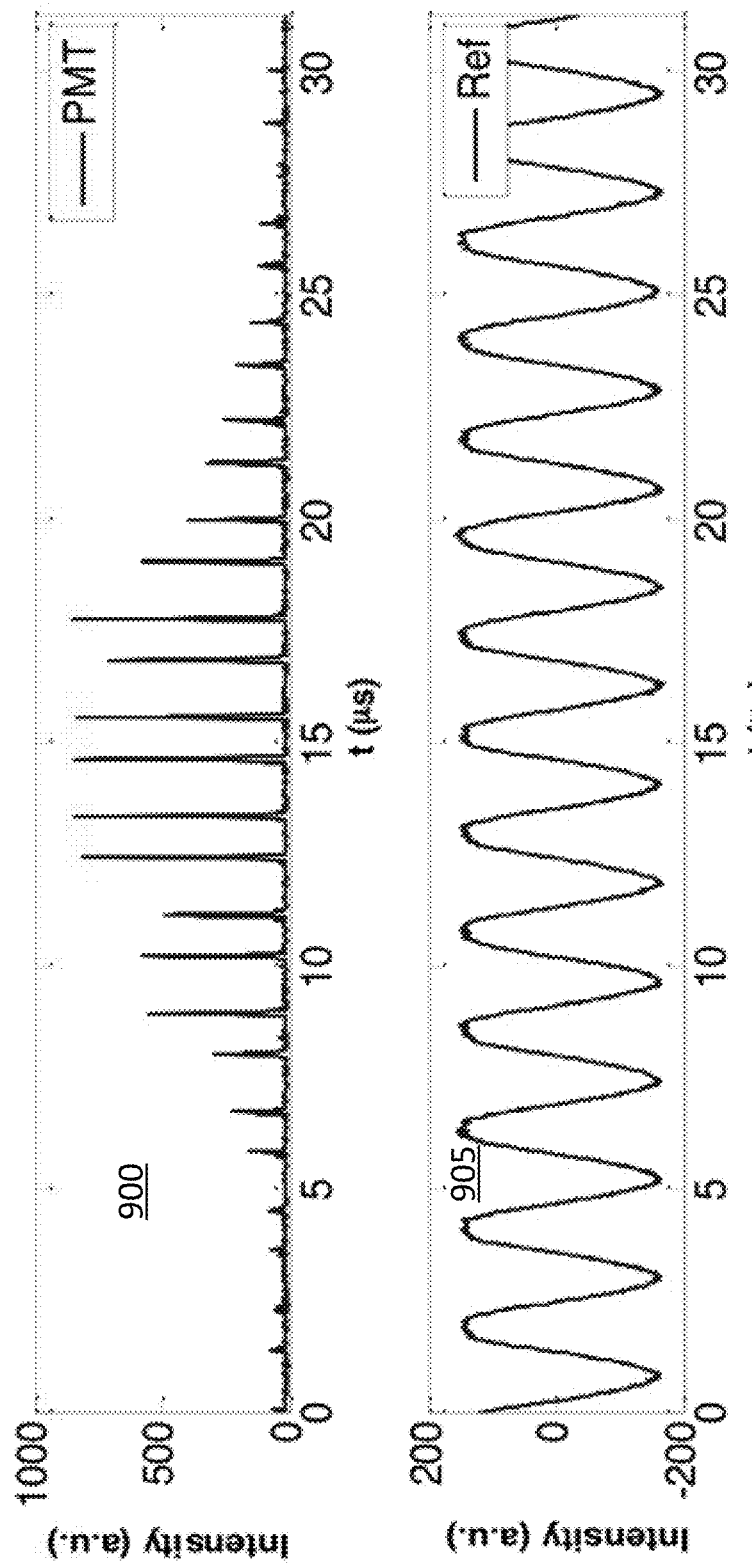

VOLUME IMAGING

CROSS-REFERENCE TO RELATED APPLICATIONS

This application claims the benefit of U.S. Provisional Application No. 61/862,570, filed on Aug. 6, 2013 and titled VOLUME IMAGING, which is herein incorporated by reference in its entirety, and the benefit of U.S. Provisional Application No. 61/887,127, filed on Oct. 4, 2013 and titled VOLUME IMAGING, which is herein incorporated by reference its entirety.

TECHNICAL FIELD

This disclosure relates to volume imaging.

BACKGROUND

Biological samples can be imaged using a microscope. Many biological samples include three-dimensional structures, and imaging the structures in three dimensions can provide additional information about the structure. A three-dimensional structure includes planes that are at different depths within the structure. Changing the position of the sample relative to an objective lens of the microscope can bring each plane in the structure into focus at a different time. In this manner, a three-dimensional image of the structure can be built up over a period of time from the images of the individual planes.

SUMMARY

In one general aspect, a laser-scanning microscope system includes a beam input system. The beam input system includes an optical element configured to direct light of a first polarization onto a first path and light of a second polarization onto a second path, a quarter-wave plate in the first path, an ultrasonic lens in the first path, and a reflective element in the first path, the reflective element positioned receive light from and reflect light toward one or more of the quarter-wave plate and the ultrasonic lens. The microscope system also includes a beam delivery system that includes first and second optical relays, at least one of which is in the second path, a scanner that receives and deflects light from the second path, and an imaging optic that directs the deflected light into a sample and receives light that emanates from the sample. The microscope system also includes a detector that receives the light that emanates from the sample from the imaging optic.

Implementations can include one or more of the following features. The optical element configured to direct light of the first polarization onto the first path can be configured to transmit light of the first polarization onto the first path, and to reflect light of the second polarization onto the second path. The optical element can include a polarizing beam splitter.

The first optical relay can be in the second path, and the second optical relay can be positioned to receive light that is deflected by the scanner. Each of the first and second optical relays can include two lenses that are arranged as a 4f system. One of the optical relays can be in the first path between the reflector and the ultrasonic lens.

The scanner can include a galvanometer scanner. The scanner can be a resonant galvanometer scanner. The scanner can be a non-resonant galvanometer scanner. The scanner can include a movable mirror that deflects the light.

The detector can include a photomultiplier tube.

The system also can include a data acquisition system that receives data from the detector, the data including a representation of an amount of light received at the detector, and the data acquisition system including one or more electronic processors, and instructions stored on a computer-readable medium, the instructions, when executed by the one or more electronic processors, causing the data from the detector to be processed into a three-dimensional representation of the sample.

The light emanating from the sample can be a laser-excited signal. The laser-excited signal can include two-photon excited fluorescence.

In another general aspect, a system for a laser-scanning microscope includes an optical element that transmits light of a first polarization onto a first path and reflects light having a second polarization onto a second path; a quarter-wave plate in the first path; a lens having a focal length that is adjustable during use of the lens; and a reflective element in the first path, the reflective element positioned receive light from and reflect light toward one or more of the quarter-wave plate and the ultrasonic lens.

Implementations can include one or more of the following features. The lens can be a lens that includes a medium that has an index of refraction that is adjusted by applying a sonic signal to the medium. The system also can include a continuous wave optical source. The system also can include a phase locked loop that receives input from the second path and provides a signal to the lens on the first path.

In another general aspect, a system for a laser-scanning microscope includes an optical element configured to transmit light in a first direction onto a first beam path and to reflect light in a second direction to a second beam path that is different from the first beam path; a reflector on the first beam path; and a lens including a variable focal length, the lens positioned on the first beam path, and the lens and reflector being positioned relative to each other to cause light transmitted by the optical element to pass through the lens a plurality of times and in a different direction each time.

Implementations can include one or more of the following features. The system also can include a feedback system that includes one or more electronic processors and a non-transitory computer-readable medium including instructions that, when executed, cause the one or more electronic processors to receive a signal that represents an amount of focusing of the lens, and change the focal length of the lens based on the received signal.

Implementations of any of the techniques described above may include an assembly, an apparatus, a system, a kit for retrofitting an existing microscope, instructions, stored on an electronic storage medium, perhaps as a computer program, that, when executed, cause an electronic processor to execute a process for stabilizing an adjustable lens and/or generating a three-dimensional image of a sample, a process, or a method. The details of one or more implementations are set forth in the accompanying drawings and the description below. Other features will be apparent from the description and drawings, and from the claims.

DRAWING DESCRIPTION

FIG. 1 is a block diagram of an exemplary system for imaging a sample that occupies a three-dimensional volume.

FIGS. 2, 4, and 5 are a block diagram of exemplary beam input systems.

FIG. 9A is a graph of intensity versus time for an exemplary signal detected by a photomultiplier tube during a single axial scan of a sample.

FIG. 9B is a graph of intensity versus time for an exemplary reference signal recorded during the axial scan of the sample.

Like reference numbers refer to like elements.

DETAILED DESCRIPTION

Figure 1:
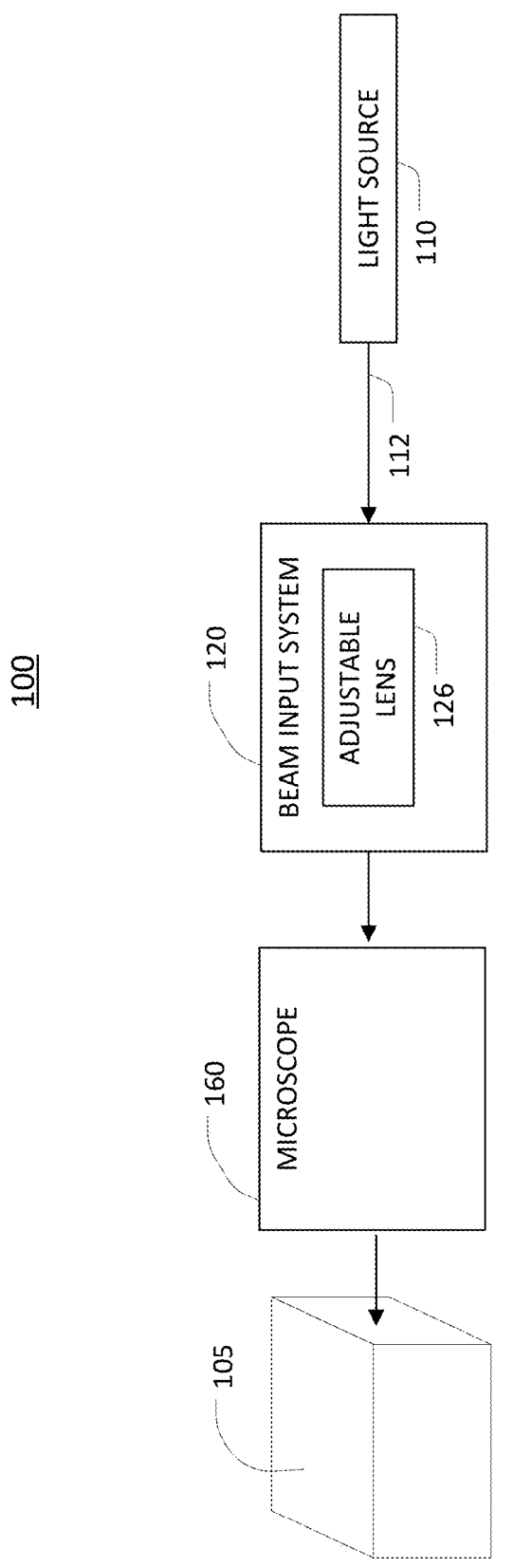
Figure 1:

Referring to FIG. 1, a block diagram of an exemplary system 100 for producing a three-dimensional image of a sample 105 is shown. The sample 105 extends in the x, y, and z directions and can be a biological sample that is static or one that changes over time. The system 100 includes a light source 110 that produces light 112. A beam input system 120 receives the light 112 and directs the light 112 to a microscope 160, which images the sample 105. The microscope 160 can be any type of laser-scanning microscope, such as, for example, a two-photon microscope or a three-photon microscope. The light source 110 can be a laser, such as, for example, a laser that produces femtosecond pulses.

The beam input system 120 includes an adjustable lens 126 that, when used in the beam input system 120, provides rapid scanning of the sample 105 in the axial (z) direction and allows the microscope 160 to be used for volumetric imaging of deep tissue in vivo and dynamic biological events, such as blood flow and transient morphology of biological structures, such as neutrophils, dendritic cells, and microglial cells. The beam input system 120 can be a kit or an assembled module for retrofitting an existing laser-scanning microscope, or the system 100 can be a fully assembled system that includes the beam input system 120.

Laser-scanning two-photon microscopy (TPM) can be used to image a highly scattering volumetric biological sample, such as lymph node, brain, and/or skull tissue. In TPM, discrete spatial points are excited with two photons, and the resulting emission is recorded at a different time, thereby reducing or eliminating random scattering induced crosstalk. A TPM can employ a galvanometer (galvo) scanner for transverse scanning (with a laser beam) of a sample (the x-y plane of FIG. 1), and the line rate can be about 2 kilohertz (kHz). Resonant galvo scanners and polygon mirrors can improve the line rate to about 20 kHz. In conventional TPM, the sample can be scanned in the axial direction (the z direction in FIG. 1) by moving the objective relative to the sample. However, moving the objective relative to the sample can be relatively slow, and the axial scan rate of such a TPM system is generally about 10 Hz or less. Even when supplemented with a remote focusing technique, the fastest scan rate along any direction with a conventional TPM is on the order of 10 kHz.

However, positioning the beam input system 120 between the light source 110 and the microscope 160 increases the axial scan rate of the microscope 160. For example, when used with the beam input system 120, the axial scan rate can reach about 1 MHz. Additionally, the cross-sectional imaging (a slice of the sample 105 in the x-z or the y-z plane) can reach a rate of about 2 kHz per frame per second, where a frame is a cross-sectional image of the sample 105 in the x-z or y-z plane. The rate at which the entire volume of the sample 105 is scanned depends on the volume of the sample 105. For example, if the sample 105 can be imaged with 100 x-z or y-z cross-sections, the volume rate can be 10-20 Hz. This increased axial scan rate can allow the microscope 160 to more effectively image highly scattering media and/or dynamic biological events. Additionally, the beam input system 120 can increase, for example, double, the axial (z direction) scan range of the microscope 160. As discussed in greater detail below, the configuration of the beam input system 120 causes the light 112 to pass through the adjustable lens 126 twice, to double the axial scan range. When used with the beam input system 120, the axial scan range of the microscope 160 can be, for example, between 40-130 microns (μm).

The beam input system 120 includes the adjustable lens 126, the use of which, without supporting components, in a two-photon microscope or other laser scanning microscope, such as the microscope 160, can present challenges. One challenge that can arise when the adjustable lens 126 is used without the beam input system 120 is that axial scan's amplitude and phase can drift due to thermal instability in the lens 126, causing image distortion. As discussed below with respect to FIG. 5, in some implementations of the beam input system 120, the optical focusing of the adjustable lens 126 is measured directly with a monitoring laser beam, and a phase locked loop drives the adjustable lens 126 at its resonance frequency. This direct monitoring of the optical focusing and the driving of the lens at its resonance frequency can reduce or eliminate the drift.

Another challenge is the relatively limited axial (z direction) scanning range of the adjustable lens 126. As discussed below with respect to FIGS. 2-5, the adjustable lens 126 is arranged relative to other components of the beam input system 120 such that the light beam 112 passes through the adjustable lens 126 more than once prior to leaving the beam input system 120 and prior to reaching the sample 105 via the microscope 160. This configuration increases the axial scan range of the adjustable lens 126.

In other words, the arrangement of the adjustable lens 126 relative to other components in the beam input system 120 and/or the precise control of the adjustable lens 126 with, for example, a phase locked loop, addresses these two challenges. In this manner, the beam input system 120 can allow the microscope 160 to be used for high-speed point scanning-based imaging.

Figure 2:
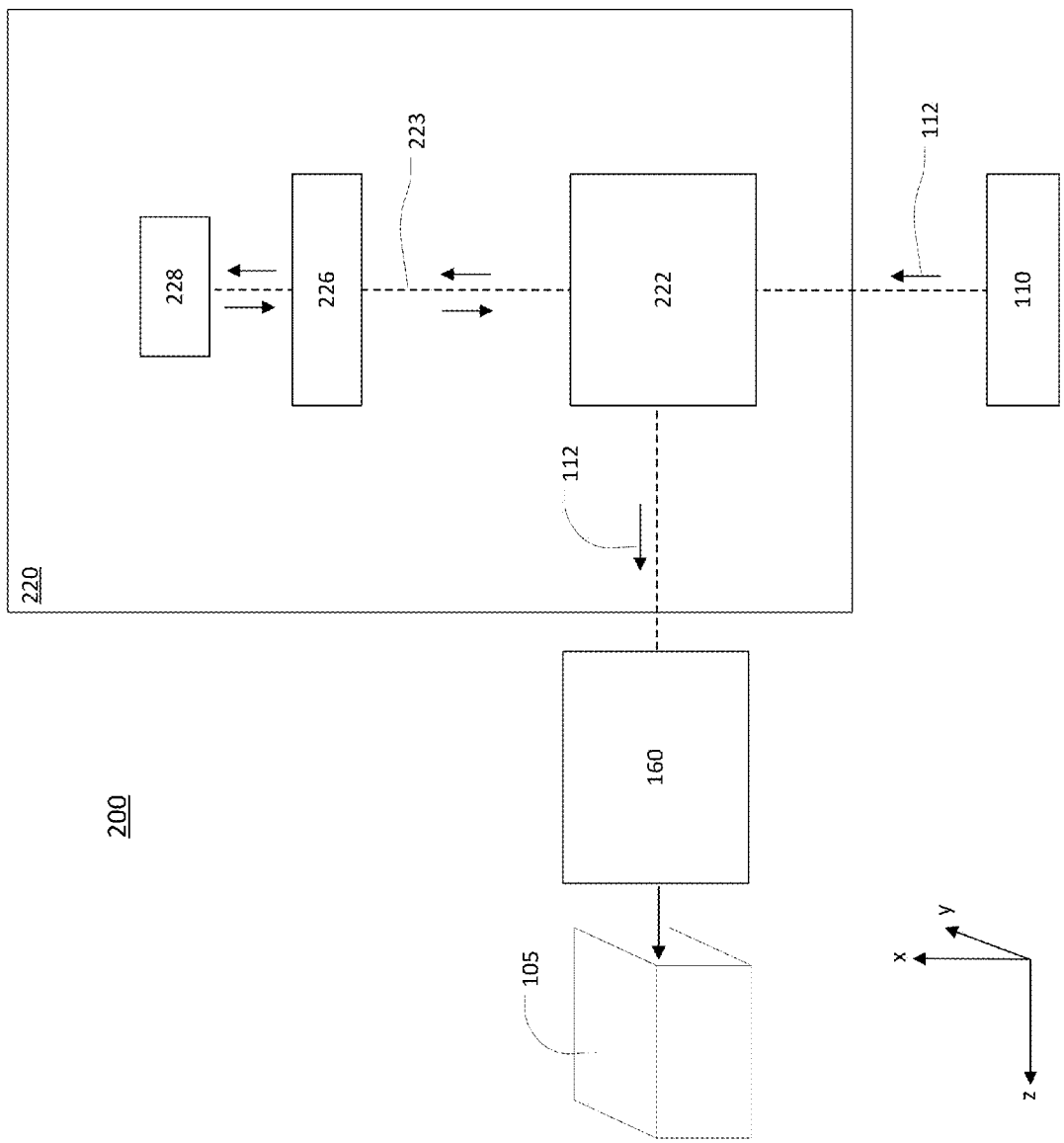
Figure 3:
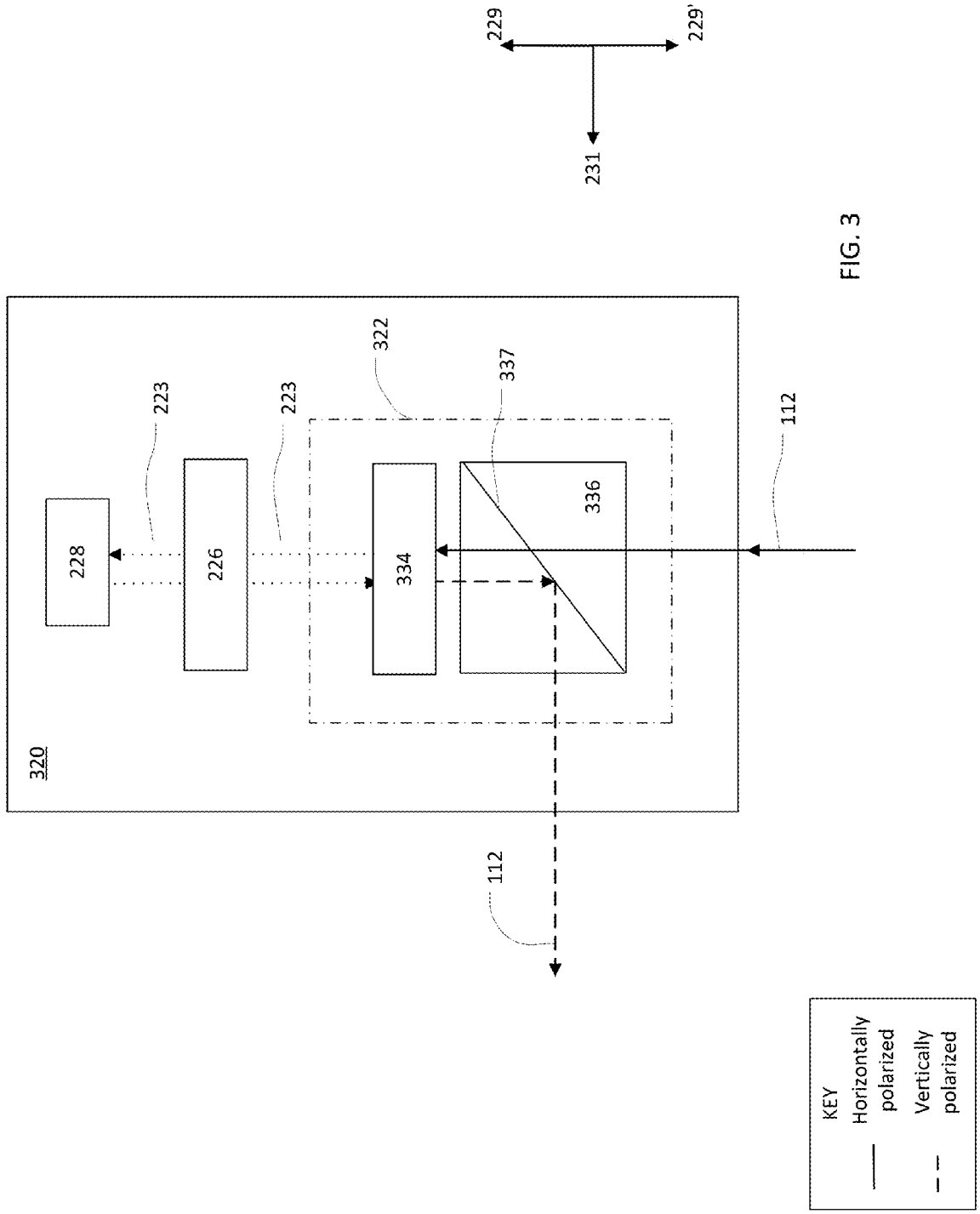
FIG. 3 is a block diagram of an exemplary optical isolator for a beam input system.
Figure 4:
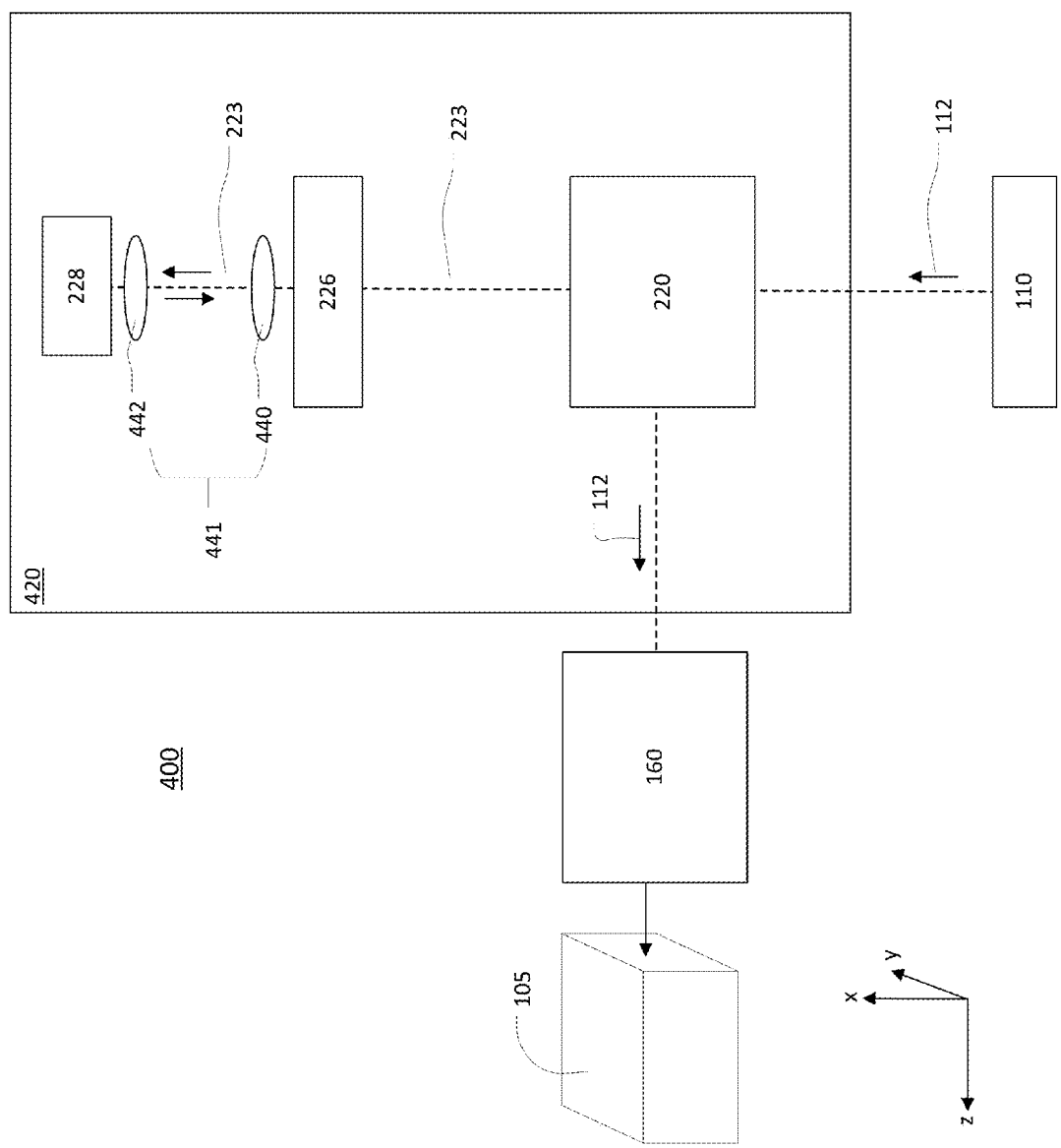

Referring also to FIGS. 2-4, block diagrams of exemplary beam input systems 220, 320, and 420, respectively, are shown. Any of the beam input systems 220, 320, 420 can be used as the beam input system 120 of FIG. 1, and the beam input systems 220, 320, 420 are discussed with respect to the microscope 160 and the light source 110 of FIG. 1. However, the beam input systems 220, 320, 420 can be used with any laser-scanning microscope.

Referring to FIG. 2, the beam input system 220 includes an optical isolator 222 and a reflector 228. Light propagates between the optical isolator 222 and the reflector 228 along a beam path 223, and through an adjustable lens 226 that is on the beam path 223. The reflector 228 can be a mirror or any other optical element that receives light from the beam path 223 and returns the light to the beam path 223.

The optical isolator 222 is an optical element, or a combination of optical elements, that transmits light in a direction 229, and reflects light along a direction 231, which is different from the direction 229. The optical isolator 222 can be any component or collection of components that allows transmission of light in only one direction. The optical isolator 222 can be a collection of optical components that includes a Faraday rotator, which applies a magnetic field to a material to cause rotation of polarization light that interacts with the material. For example, the optical isolator can be a polarization dependent isolator that includes an input polarizer, a Faraday rotator, and an output polarizer. In some examples, the optical isolator 222 can be a polarization independent isolator that includes an input birefringent wedge, a Faraday rotator, and an output birefringent wedge. In some implementations (such as the optical isolator shown in FIG. 3), the optical isolator 222 lacks a Faraday rotator while still functioning to allow transmission of light in only one direction.

The adjustable lens 226 is an optical component that has a focal length that is adjustable, controllable, or otherwise variable during use. The focal length of a lens, which is the distance from the lens at which collimated rays interacting with the lens converge, depends on properties such as the index of refraction of the material that makes up the lens and/or the curvature of the lens. In some implementations, the adjustable lens 226 can include a medium with an index of refraction can be varied during use. For example, the medium can be a fluid having an index of refraction that changes when sound waves that change the density of the fluid are applied. In these implementations, the medium of the adjustable lens 226 is positioned on the beam path 223 such that light propagating on the beam path 223 interacts with the medium. Because the focal length of the lens 226 depends on the index of refraction, changing the index of refraction causes a corresponding change in the focal length and the location of the focal point along the direction of propagation without moving the lens 226 along the beam path 223 relative to the reflector 228 or the isolator 222. In these implementations, the adjustable lens 226 can be, for example, a TAG Lens 2.0, available from TAG Optics of Princeton, N.J.

In the example shown in FIG. 2, the light 112 from the optical source 110 propagates in the direction 229 and is transmitted by the optical isolator 222 on to the beam path 223 in the direction 229. After passing though the optical isolator 222, the light 112 passes through the adjustable lens 226 in the direction 229 and is reflected by the reflector 228. The light 112 then propagates along the beam path 223 in a direction 229', which is opposite to the direction 229. The light 112 passes through the adjustable lens 226 a second time in the 229' direction. In the example of FIG. 2, the light 112 passes through the adjustable lens 226 twice, one in each of the directions 229 and 229', which are opposite to each other. Light that propagates along the path in the direction 229' can propagate through the same spatial region, a partially overlapping region, or a different spatial region as light that propagates along the path in the direction 229. Thus, although the light 112 passes through the adjustable lens 226 twice in directions that are opposite to each other in the example of FIG. 2, in other examples, the light 112 can pass through the adjustable lens 226 in two directions that are different from each other but not opposite.

Due to the arrangement of the elements in the beam input system 220, light that enters the path 223 by passing through the optical isolator 222 propagates through the adjustable lens 226 twice and in a different direction each time. Each pass of the light 112 through the adjustable lens 226 occurs with the lens 226 in the same location on the beam path 223 relative to the reflector 228 and the optical isolator 222. Passing the light 112 through the adjustable lens 226 in this manner allows the lens 226 to be used more effectively and increases the axial scan range of the adjustable lens 226. For example, the arrangement of the beam input system 220 can double the axial scan range (the scan range in the z direction in the sample) of the adjustable lens 226. By increasing the axial scan range, the range of the focus oscillation induced by the adjustable lens 226 can be increased. In some implementations, the axial scan range of the adjustable lens 226, when used in the beam input system 220, can be 40 µm to 130 µm.

After passing through the adjustable lens 226 the second time, the light 112 is reflected by the optical isolator 222 along the direction 231 toward the microscope 160. The optical isolator 222 reflects none, or only a nominal amount of, the light 112 that propagates along the path 223 in the direction 229' back into the beam path 223.

Referring also to FIG. 3, a block diagram of an exemplary beam input system 320 that includes an exemplary optical isolator 322 is shown. The optical isolator 322 is discussed relative to the reflector 228 and the adjustable lens 226 of the beam input system 220 of FIG. 2, with the beam path 223 being between the optical isolator 322 and the reflector 228. However, the optical isolator 322 can be used in other beam input systems.

The optical isolator 322 transmits the light 112, which travels in the direction 229, onto the beam path 223. The optical isolator 322, which includes a quarter-wave plate (QWP) 334 and a polarizing beam splitter 336, transmits light of a first polarization (shown with a solid line) along the direction 229 and reflects light of a second polarization (shown with a dashed line) along the direction 231. The first and second polarizations are different. For example, the first polarization can be horizontally polarized laser light, and the second polarization can be vertically polarized light.

The polarizing beam splitter 336 includes an interface 337 that transmits light having the first polarization and reflects light having the second polarization. In the example of FIG. 3, the light 112 has the first polarization (horizontally polarized in this example) when incident on the optical isolator 322 and is transmitted through the interface 337. After passing through the polarizing beam splitter 336, the light 112 is horizontally polarized and then passes through the QWP 334, becoming circularly polarized. In this example, the light 112 becomes circularly polarized (shown with a dotted line), and propagates on the beam path 223 in the direction 229. The light 112 makes a first pass through the adjustable lens 226 and is reflected from the reflector 228, propagates in a direction 229' along the beam path 323, and makes a second pass through the adjustable lens 226. The light 112 then enters the QWP 334, becoming vertically polarized. In this example, the QWP 334 rotates the light 112 to be vertically polarized. The light 112 that travels in the direction 229' after reflection from the reflector 228 thus has the second polarization when incident on the polarizing beam splitter 336 and the interface 337. As a result, the light 112 propagating in the direction 229' is reflected from the interface 337 along the direction 231.

This arrangement of the optical isolator 322 results in little, if any, loss of the light 112 and allows all, or almost all, of the light 112 to pass through the adjustable lens 326 twice prior to reaching the microscope. For example, the optical isolator 322 can output 99% or 95% of the light that is initially incident on the optical isolator 322 along the direction 231.

Referring to FIG. 4, a block diagram of another exemplary beam input system 420 is shown. The beam input system 420 is part of a system 400 that produces volumetric images of the sample 105. In addition to the beam input system 420, the system 400 includes the microscope 160 and the light source 110.

The beam input system 420 is similar to the beam input system 220 (FIG. 2), except the beam input system 420 includes relay lenses 440 and 442, each of which are positioned on the beam path 223, between the adjustable lens 226 and the reflector 228. Together, the relay lenses 440 and 442 form a relay imaging system 441 that images the reflector 228 onto the adjustable lens 226 and the adjustable lens 226 onto the reflector 228.

Two lenses positioned in a 4-f relay configuration map spatial information in an object plane onto an image plane, magnified by a factor that depends on a ratio of the focal lengths of the two lenses. For lenses having the same focal length, there is no magnification.

In the example of FIG. 4, the relay imaging system 441 is a 4-f relay configuration formed from two lenses. However, other techniques for relay imaging besides the 4-f relay can be used. For example, any collection of components that acts to image the reflector 228 onto the adjustable lens 226 and vice versa can be used as the relay imaging system 441.

In the example of FIG. 4, the relay imaging system 441 formed by the lenses 440 and 442 maps the adjustable lens 226 onto the reflector 228 and vice versa. To arrange the relay imaging system 441, the lens 440 is positioned at one of its focal lengths from the adjustable lens 226 and the lens 442 is positioned at one of its focal lengths from the reflector 228, with one focal plane in overlap. The lenses 440 and 442 each have a focal length, and the focal lengths can be different or the same, depending on the desired magnification.

Figure 5:
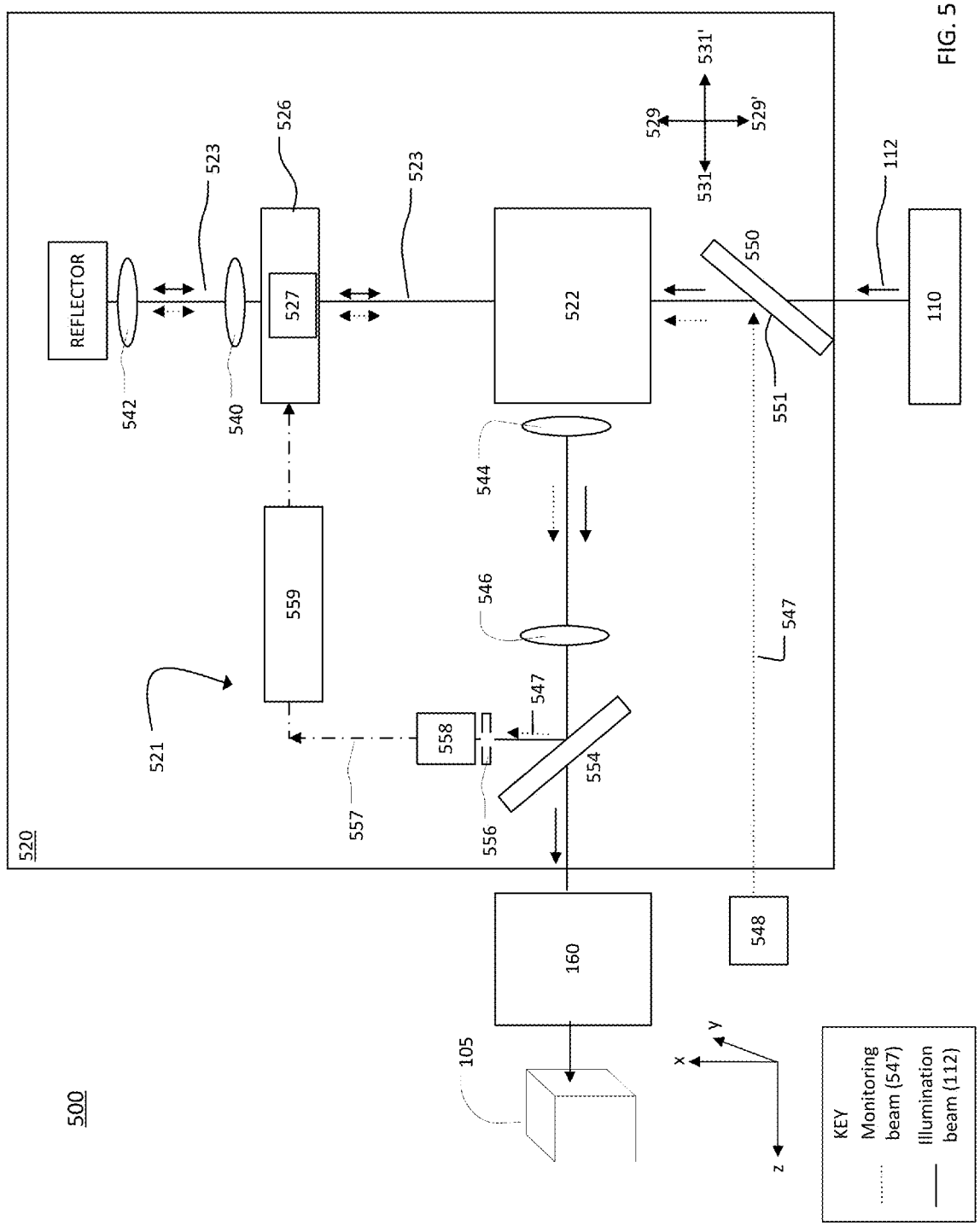

Referring to FIG. 5, a block diagram of another exemplary beam input system 520 is shown. The beam input system 520 includes an adjustable lens 526 and is part of a system 500 that images the volumetric sample 105 with the microscope 160. The system 500 also includes the light source 110, and the beam input system 520 is positioned between the light source 110 and the microscope 160. The beam input system 520 delivers illumination light to the microscope 160 and allows the microscope 160 to rapidly scan the sample 105 with the light 112 and produce a three-dimensional or volumetric image of the sample 105.

The beam input system 520 is similar to the beam input systems 220 (FIG. 2) and 420 (FIG. 4). However, the beam input system 520 also includes a feedback system 521 that provides precise control of the adjustable lens 526, which can be an ultrasonic lens that contains a medium 527 positioned on the beam path 523. The adjustable lens 526 can be, for example, a TAG Lens 2.0, available from TAG Optics of Princeton, N.J.

An ultrasonic lens applies sonic waves to a medium contained in a lens housing. The medium can be a gas or liquid. In some implementations, the medium can be a solid, or can include solid components. For example, the medium can be glass or a crystal. The sonic waves can be applied to the medium 527 through a sonic transducer, which converts energy into a sonic wave. For example, in response to an applied voltage, the sonic transducer can produce a sound wave with an amplitude and a phase that are proportional to the amplitude and the phase of the applied voltage. The amplitude and phase of the ultrasonic lens depend on the driving signal's (the applied voltage's) amplitude and phase, and on whether the driving signal is on resonance. When the driving signal is exactly on resonance, there is a 90 degree phase difference between the driving signal and the oscillation of the ultrasonic lens. The sound waves vibrate the medium, causing the atoms and/or molecules of the medium 527 to move closer together in some areas and further apart in others. As compared to the ambient state of the medium 527, the index of refraction increases where the molecules and/or atoms move closer together and decreases where the molecules and/or atoms move further apart. The amplitude and the phase of the sound waves vary spatially over the medium 527, establishing an index of refraction profile that varies spatially in the adjustable lens 526. The index of refraction profile can approximate a lens. For example, the index of refraction profile of the central part of the adjustable lens 526 can approximate a simple lens.

When the sound wave is at the resonance frequency of the adjustable lens 526, a standing sound wave can exist in the medium 527. By varying the amplitude and phase of the sound waves, the index of refraction profile across the medium 527 also changes. In this manner, the focal length of the adjustable lens 526 can be varied by controlling the sound wave that is applied to the medium 527. The feedback system 521 provides precise control of the voltage that is applied to the transducer and controls the sound wave that is applied to the medium 527 of the lens 526. The feedback system 521 includes a detector 558, which measures a power of the monitoring beam 547, and a phase-locked loop 559. The phase-locked loop 559 is used to drive the adjustable lens 526 at its resonance frequency.

In greater detail, the light 112 (shown with a solid line) emitted from the light source 110 propagates in a direction 529, and a monitoring beam 547 (shown with a dotted line) from a monitoring light source 548 propagates in a direction 531' toward a dichroic beam splitter 550. The light 112 can be a horizontally polarized laser beam from a pulsed femtosecond laser. The microscope 160 uses the light 112 (which is also referred to as the illumination beam) to illuminate the sample 105. The monitoring light source 548 can be a continuous-wave (CW) laser, such as a diode laser, and the monitoring beam 547 can be a continuous wave laser beam that has the same polarization as the light emitted from the source 110 and has a different wavelength or wavelength band than the light 112 emitted from the source 110.

The dichroic beam splitter 550 has an interface 551 that transmits light of a first wavelength or wavelength band (the light 112) and reflects light of a second, different wavelength band (the monitoring beam 547). In the example of FIG. 5, the interface 551 is oriented at an angle relative to the direction 529 such that the monitoring beam 547 is deflected from the interface 551 in the direction 529. Thus, the dichroic beam splitter 550 causes the light 112 and the monitoring beam 547 to propagate in the direction 529 toward the optical isolator 522, which transmits the light 112 and the monitoring beam 547 onto a beam path 523.

After passing through the optical isolator 522, the monitoring beam 547 and the light beam 112 propagate through the adjustable lens 526 and a pair of relay lenses 540 and 542 in the direction 529. The relay lenses 540 and 542 are on the beam path 523 between the adjustable lens 526 and the reflector 528. The lenses 540 and 542 are arranged in a 4-f configuration to image the adjustable lens 526 onto a reflector 528. The reflector 528 directs the light 112 and the monitoring beam 547 back onto the beam path 523 in the direction 529'. The light 112 and the monitoring beam 547 pass through the relay lenses 540 and 542 and the adjustable lens 526 a second time before being deflected toward the microscope 160 by the optical isolator 522.

The monitoring beam 547 and the light 112 propagate in the direction 531 toward a second dichroic beam splitter 554. The beam input system 520 also includes lenses 544 and 546, which are arranged in a 4-f configuration between the optical isolator 522 and a scanning mirror (not shown) that is between the dichroic beam splitter 554 and the microscope 160. The dichroic beam splitter 554 separates the light beam 112 and the monitoring beam 547, transmitting the light beam 112 and allowing it to propagate toward the microscope 160, and reflecting the monitoring beam 547 toward the feedback system 521.

The monitoring beam 547 passes through an aperture 556, is spatially filtered by the aperture 556, and passes to a detector 558. The detector 558 can be, for example, a photodiode or any other detector that produces a current and/or voltage in response to detecting light. The amount of optical power measured by the detector 558 is an indication of the ultrasound-induced lensing or focusing of the adjustable lens 526. Applying sound to the medium 527 of the lens 526 causes the index of refraction of the medium 527 to vary between a high state that causes greater focusing and a low state that causes less focusing. As a result, light passing through the adjustable lens 526 oscillates between converging and diverging states depending on how much the medium 527 focuses light. This focusing or lensing of the adjustable lens 526 can be directly measured at the detector 558. In particular, the power measured by the detector 558 for a diverging beam passing through the aperture 556 is lower than the power measured by the detector 558 for a converging beam. Thus, by monitoring the optical power passing through the aperture 556 with the detector 558, the ultrasound-induced lensing effect can be measured.

Without feedback, the ultrasound-induced lensing effect can drift. However, the detector 558 provides a signal 557 that is proportional to the measured power of the monitoring beam 547 (after passing through the adjustable lens 526 twice) to the phase-locked loop 559. The phase-locked loop 559 uses the signal 557 from the detector 558 as a feedback signal and drives the adjustable lens 526 at its resonance frequency to maintain a consistent amplitude and phase of the ultrasound-induced lensing.

In one implementation, the adjustable lens 526 has a resonance at about 455 kHz, and, therefore, a single axial scan of the sample took about 1.1 microseconds (µs) (two axial scans can be collected per oscillation period of the standing wave). The central area of the lens 526 was about 1.7 millimeters (mm) in diameter. The relay lens 540, 542 and 544, 546 have focal lengths to provide a magnification of about 3 (for example, each of the relay lens pair can include one of a 100 mm focal length lens, such as the AC254-100B, available from ThorLabs, Inc. of Newton, N.J., and a 300 mm focal length lens, such as the AC253-300-B, available from ThorLabs, Inc. of Newton, N.J.). In this implementation, the axial scan range was about 40 microns (µm).

Other implementations can achieve a greater axial scan range with the same adjustable lens driven at its resonance frequency with the feedback system 521. For example, by using a relay lens pair that provides a lower magnification (for example, a 150 mm focal length lens and a 250 mm focal length lens, such as, respectively, the AC254-150-B and CS254-250-B available from ThorLabs, Inc. of Newton, N.J.), an axial scan range of about 130 µm can be achieved. However, when the beam magnification is reduced, the beam may not fill the entire aperture of the objective pupil, which can lead to a lower axial resolution.

Figure 6:
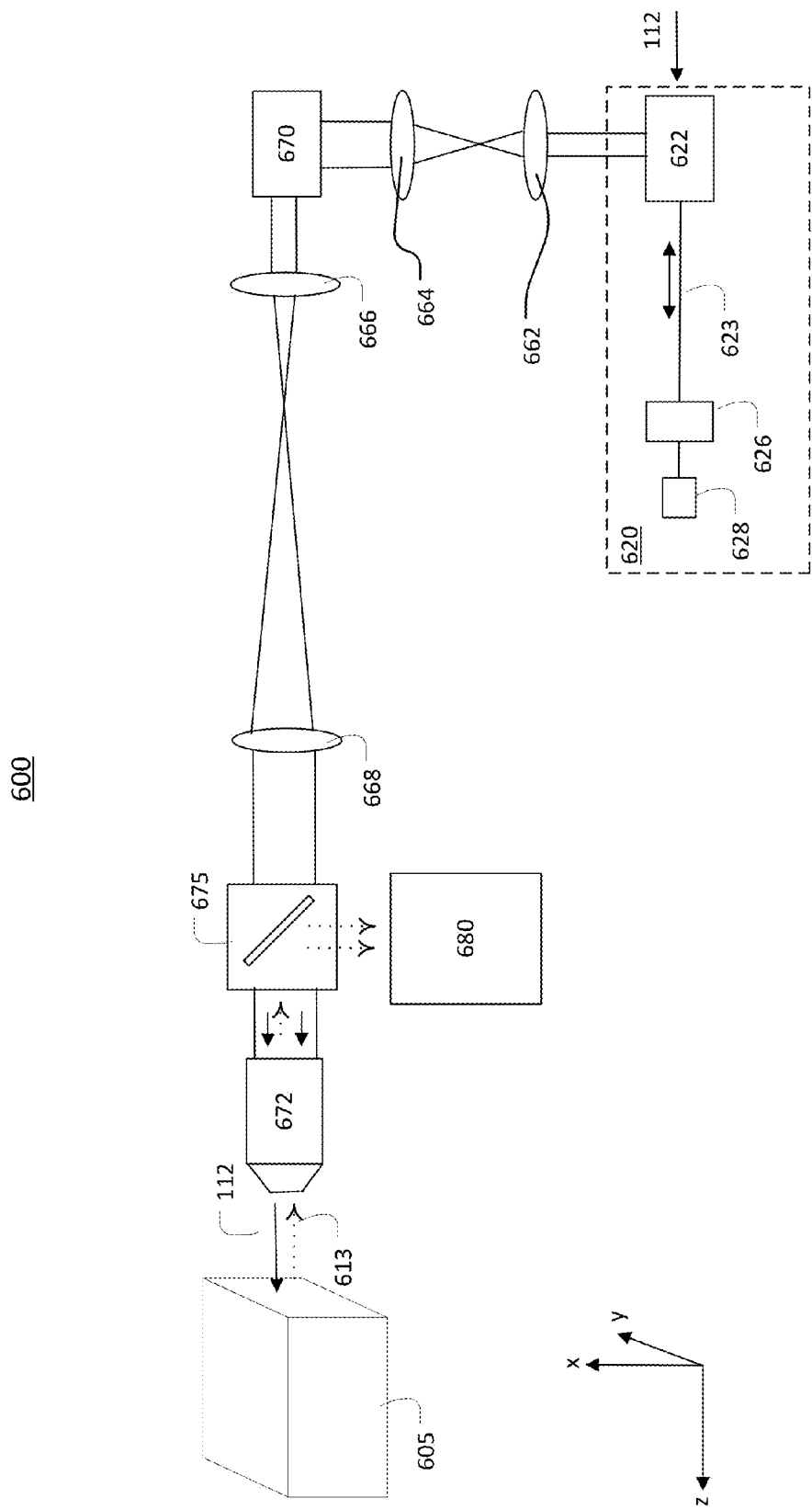
FIG. 6 is a block diagram of another exemplary system for imaging a sample.

Referring to FIG. 6, a block diagram of a high-speed volume imaging system 600 is shown. The imaging system 600 includes a beam input system 620, which includes an optical isolator 622, a reflector 628, and an adjustable lens 626. The beam input system 620 can be any of the beam input systems 120, 220, 420, or 520 discussed above, and the beam input system 620 can include additional components other than the isolator 622, the reflector 628, and the lens 626.

The light 112 is transmitted through the optical isolator 622 and onto a beam path 623. The light 112 passes through the adjustable lens 626, is reflected from the reflector 628 back onto the beam path, passes through the adjustable lens 626 a second time, and is deflected out of the beam input system 620 by the optical isolator 622.

The system 600 also includes lenses 662, 664, which are arranged in a 4-f configuration, and lenses 666, 668, which are also arranged in a 4-f configuration. The lenses 662, 664 form an image of the reflector 628 on a galvo scanner 670. The galvo scanner 670 can be a resonant and/or a nonresonant x-y Galvo scanner. The second 4-f system, formed by the lenses 666, 668, images the galvo scanner 670 onto the rear pupil plane of an objective lens 672. Together, these four lenses 662, 664, 666, 668 form two 4-f systems that help to ensure that the adjustable lens 626 is imaged close to the rear pupil plane of the objective lens 672. The objective lens 672 directs the illuminating light 112 to a sample 605 and receives light 613 (shown as a dotted line) from a sample 605. The light 613 can be a laser-excited signal (for example, multi-photon excited fluorescence, such as two-photon excited fluorescence), and the light 613 is collected by the objective lens 672 and directed by a beam splitter 675 toward a detector 680, which can be a photomultiplier tube (PMT).

Figure 7:
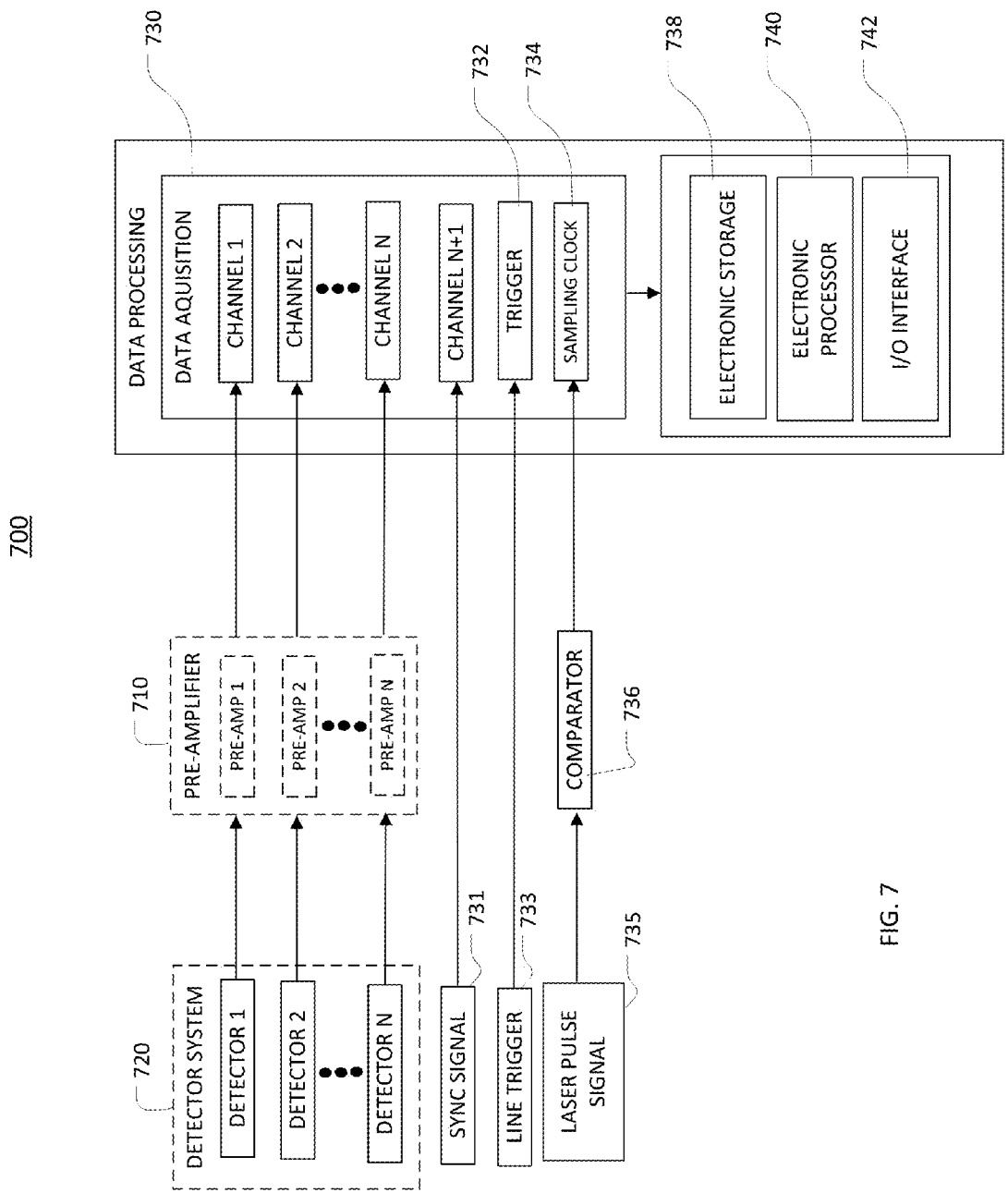
FIG. 7 is a block diagram of a data processing system that can be used to process data from a system that images a sample.

Referring to FIG. 7, a block diagram of a data processing system 700 for a volume imaging system is shown. The system 700 can be used to process data from a laser-scanning microscopy system that includes a beam input system with an adjustable lens such as the system 600 of FIG. 6.

The system 700 includes a preamplifier system 710 that receives signals from a detector system 720. The detector system 720 can include a single detector or multiple detectors. In the example of FIG. 7, the detector system includes detectors 1-N. Each of the detectors can be, for example, a photomultiplier tube (PMT) that measures light 613 that emerges from the sample 605 (FIG. 6). In some implementations, each of the detectors 1-N can measure light of a different wavelength (color) or band of wavelengths.

Each of the 1-N detectors in the detector system 720 produces a voltage signal, the value of which represents an amount of light detected by the detector. The signal from each of the detectors in the detector system 720 is amplified by a respective high-speed preamplifier 1-N in the preamplifier system 710. The amplified output from the preamplifier system 710 is digitized by a high-speed data acquisition (DAQ) card 730, with the output of each of the preamplifiers in the preamplifier system 710 going to a different channel of the DAQ 730. A synchronization signal 731 is also provided to a channel of the DAQ card 730. The synchronization signal 731 contains the information of the axial scan information. In some implementations, the monitoring beam 547 (FIG. 5) is used to generate an electrical signal that acts as the synchronization signal 731.

The DAQ card 730 also includes a trigger 732, which receives a line trigger signal 733, and a sampling clock 734, which receives a laser pulse signal 735 that is derived from the light 112. A trigger signal on the microscope 160 can be used as the line trigger 733, which is input into the DAQ card 730 and used as the trigger 732. In the example of FIG. 7, a comparator 736 receives the pulse train of the light 112 and converts the pulse train into digital pulses that are used as the sampling clock 734.

The system 700 also includes an electronic storage 738, an electronic processor 740, and an input/output (I/O) interface 742. The data provided to the DAQ card 730 is stored in an electronic storage 738 and can be processed by the electronic processor 740. The electronic storage 738 may be volatile memory, such as RAM, or non-volatile memory. In some implementations, and the electronic storage 738 can include non-volatile and volatile portions or components. The electronic processor 740 may be one or more processors suitable for the execution of a computer program such as a general or special purpose microprocessor, and any one or more processors of any kind of digital computer.

Generally, a processor receives instructions and data from a read-only memory or a random access memory or both. The electronic processor 740 can be any type of electronic processor and can be more than one electronic processor. The electronic storage 738 stores instructions, perhaps as a computer program, that, when executed, cause the processor 740 to communicate with other components in the device. For example, the instructions can be instructions to cause the electronic storage 738 to store data from the DAQ card 730. The instructions can be instructions that cause the electronic processor 740 to process the data from the detector system into a volumetric image of the sample. Additionally, the electronic storage 738 can store processed data, such as a digital representation a reconstructed volumetric image of the sample.

The I/O interface 742 can be, for example, a display that visually presents data to a human operator, a communications interface that allows data to be input into or read from the electronic storage 738, and/or a tactile device that an operator of the system 700 can use to interact with any of the components of the system 700 and/or the data stored or received by the system 700.

Figure 8:
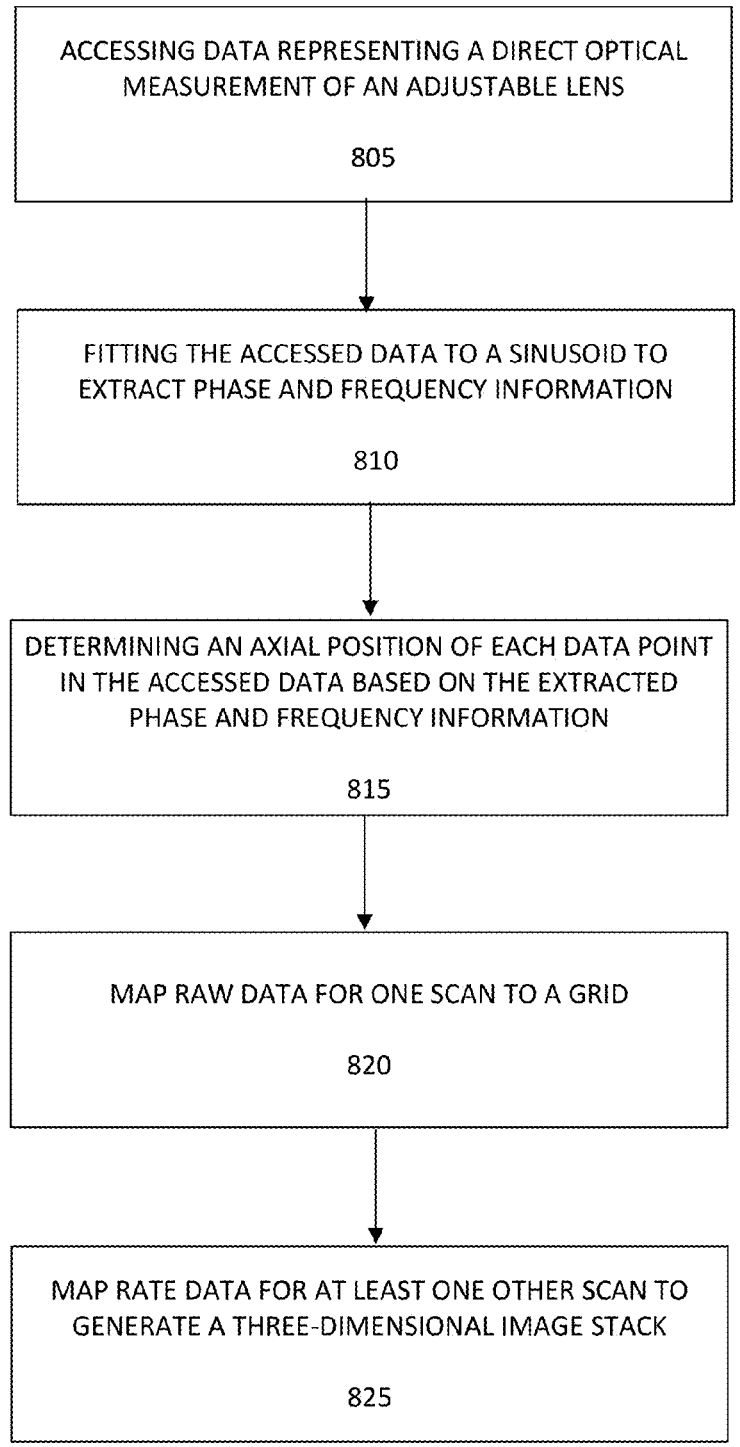
FIG. 8 is a flow chart of an exemplary process for reconstructing an image of a volumetric sample.

Referring to FIG. 8, a flow chart of an exemplary procedure 800 for reconstructing a volumetric image of a three-dimensional biological sample is shown. The procedure 800 is discussed with respect to the system 500 of FIG. 5 and the system 700 of FIG. 7. However, the exemplary procedure 800 can be performed on data collected from any laser-scanning microscopy system that employs a beam input system that directly measures the lensing of the adjustable lens. The procedure 800 can be performed by the electronic processor 740 of FIG. 7.

Data representing a direct optical measurement of a lensing or focusing of an adjustable lens is accessed (805). The direct optical measurement of the lensing contains information on the axial scan position. The accessed data can be, for example, the synchronization signal 731 (FIG. 7), which is stored in the electronic storage 738. The synchronization signal 731 can be a current or voltage signal produced by the detector 558 (such as the signal 557 of FIG. 5). As discussed above, the signal 557 produced by the detector 558 represents the power of the monitoring beam 547 (FIG. 5), with lower powers indicating that the monitoring beam is in a diverging state and higher powers indicating that the monitoring beam is in a converging state. Thus, the amplitude and/or frequency of the signal 557 produced by the detector 558 indicates the amount of lensing or focusing caused by the adjustable lens 526 at a particular time. The amplitude of the signal 557 indicates the focusing of the lens, which, in turn, indicates the axial position of the focus in the sample 105.

A sinusoidal fitting is applied to the accessed data to extract the phase and frequency of the axial scanning (810). The axial position of each data point in the accessed data is determined based on the extracted phase and frequency (815). The amplitude of the signal 557 produced by the detector 558 indicates the focusing strength of the adjustable lens 526. The focusing strength of the adjustable lens 526 provides an indication of the axial position of the focus of the light 112 in the sample 105. The axial scan of the adjustable lens 526 is sinusoidal, and is thus amenable to being fit to a sinusoidal curve. From the fitted sinusoidal curve, the axial (z) position can be determined.

As discussed above, the monitoring beam 547, which is the beam from which the direct optical measurement is derived, and the light 112, which is the illumination beam, both pass through the beam input system 520. The light 112 continues to the microscope 160 and illuminates a sample, producing a laser-excited signal that is detected by a detector such as a photomultiplier tube arranged relative to the sample 105 in a configuration that is similar to the arrangement of the detector 680 relative to the sample 605 in FIG. 6. The raw data is stored in the DAC 703 and/or the electronic storage 738. The microscope 160 collects data by scanning the sample 105 in the x-z plane (or the y-z plane) and then deflecting the light 112 in the y direction relative to the sample 105 (FIG. 5) to collect another frame of raw data in the x-z plane (or the y-z plane) until data representing the entire sample 105 has been collected.

A two-dimensional linear interpolation is applied to map the raw data in the x-z plane (or the y-z plane) onto a regularly shaped grid (820). The processed x-z (or y-z) frame can include 1024×40 voxels such that each axial step size (the step size between each point in the z direction) is about one-third of the axial point spread function (PSF) at full width at half max (FWHM). The axial PSF is the resolution in the axial (z) direction). Elements 805-820 are applied to each of the x-z raw data sets (with each set being at a different y position) to obtain a three-dimensional image stack that represents the sample 105. In some implementations, the data is collected in y-z planes. In these implementations, elements 805-820 are applied to each of the y-z raw data sets (with each set being at a different x position) to obtain a three-dimensional image stack that represents the sample 105.

The three-dimensional image stack is presented (825). For example, the three-dimensional image stack can be visually presented on the I/O interface 842. In some implementations, the three-dimensional image stack also can be manipulated by a human operator or an automated, machine-based electronic process.

Figure 9D:
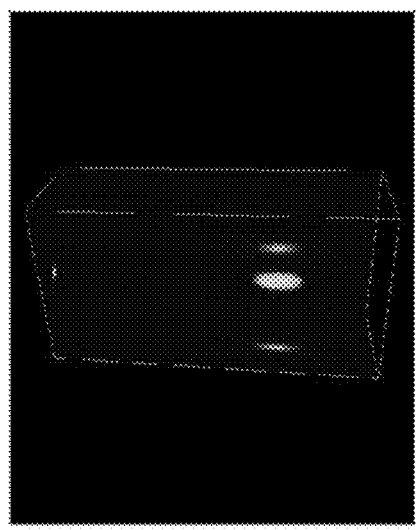
FIG. 9D is a volumetric view of the image of FIG. 9C.

Referring to FIGS. 9A-9D, an example of data processing and image reconstruction obtained from a system that used a beam input system in conjunction with a laser-scanning microscope is shown. FIG. 9A shows a plot of intensity of a signal 900 from a photomultiplier tube (such as the detector 680 in FIG. 6) during a single x-z scan of a 1-micron diameter fluorescence bead as a function of time.

Figure 9C:
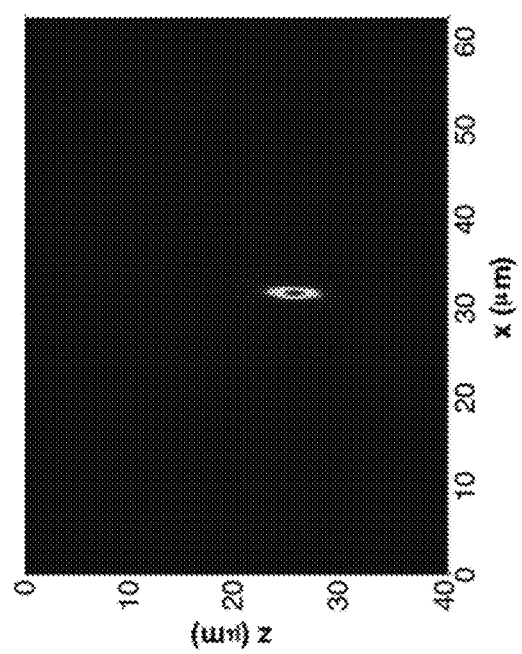
FIG. 9C is an image of a sample reconstructed from the detected signal of FIG. 9A.

FIG. 9B shows a plot of intensity of a reference signal 905 recorded during the same x-z scan. FIG. 9C is an image of the bead reconstructed from the signal 900 of FIG. 9A. FIG. 9D shows a volumetric view of the same reconstructed image of the bead, with the maximum intensity projections shown.

Figure 10B:
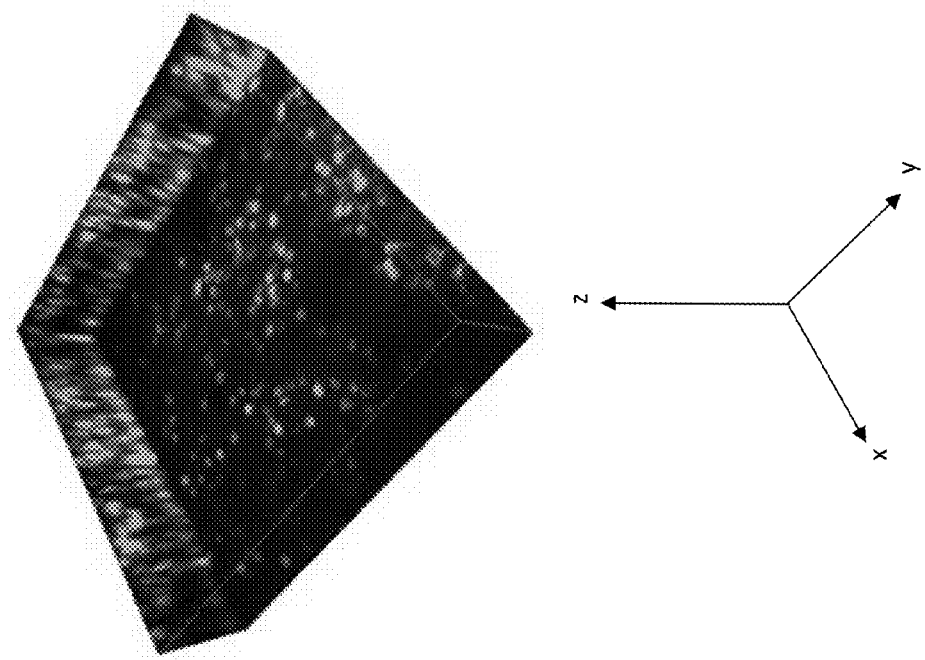
FIG. 10B is exemplary image stack showing a volumetric view of the sample of FIG. 10A where the image stack was generated from data collected with a laser scanning microscope system that uses a beam input system.
Figure 10A:
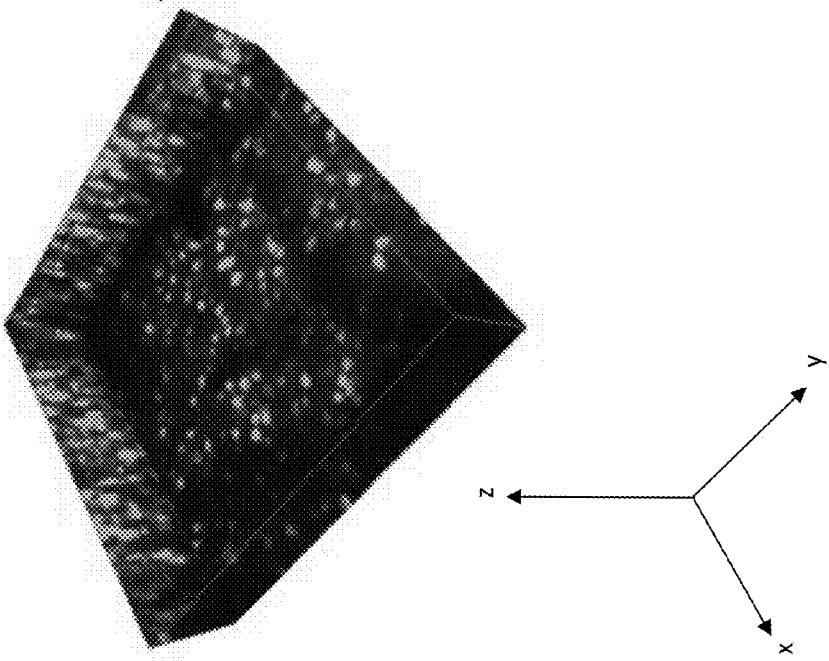
FIG. 10A is exemplary image stack showing a volumetric view of a sample where the image stack was generated from data collected with a laser scanning microscope system.

Referring to FIGS. 10A and 10B, exemplary volume images are shown. FIG. 10A shows a volume image reconstructed from data recorded by a microscope system that lacked a beam input system and achieved axial scanning by translating the objective lens in the axial direction relative to the sample. The volume image was generated by recording x-y planes of the sample at various z (axial) depths. FIG. 10B shows a volume image of the same sample reconstructed from data collected with a system that includes a beam input system with an ultrasonic lens that is controlled with a phase-locked loop (such as the system 500 of FIG. 5). The volume was 500×500×130 µm³.

For the image shown in FIG. 10A, the image stack was recorded in about 75 seconds (s) with 1 µm axial step size between each recorded x-y plane. The illuminating laser had a wavelength of 935 nanometers (nm) and a power of about 30 milliwatts (mW). Each x-y plane was recorded at a different time. As a result, the fluorescence variation (calcium signal) introduced artifacts in the axial direction. For the image shown in FIG. 10B, the recording time was about 0.57 seconds (s), and the sample was scanned in x-z planes at various y locations. The illuminating laser had a wavelength of 935 nm and a power of about 90 mW. As compared to the image of FIG. 10A, the image of FIG. 10B has little to no artifacts in the x-y direction.

Other implementations are within the scope of the claims. For example, the reflectors 228, 428, 528, and 628 can be any type of optical element that with high, for example, 90% or greater reflectivity at the wavelength of the light 112. In some implementations, the reflector can be a silver coated mirror.

Any type of optical element that allows adjustment of the focus and/or depth of field during use can be used as the lens 126, 226, 526, or 626. For example, in some implementations, the adjustable lens 226 can be an electric lens with a curvature (and focal length) that changes in response to the application of an electrical signal. An example of an electric lens is the EL-10-30, available from OptoTune of Switzerland.

The beam input systems 120, 220, 320, 420, 520, and 620 can have a housing that contains at least a reflector, an optical isolator, and an adjustable lens. The housing can have connections that allow the housing to be connected between a laser-scanning microscope and a light source with the internal optical components of the beam input system being optically aligned with the microscope and the light source.

What is claimed is:

1. A laser-scanning microscope system comprising:
    a beam input system comprising:
        an optical element configured to transmit light of a first polarization onto a first path and to reflect light of a second polarization onto a second path,
        a quarter-wave plate in the first path,
        a lens comprising a focal length that is adjustable during use of the lens, and
        a reflective element in the first path, the reflective element positioned to receive light from and reflect light toward one or more of the quarter-wave plate and the lens, the lens being between the reflective element and the quarter-wave plate;
    a beam delivery system comprising:
        first and second optical relays, at least one of which is in the second path,
        a scanner that receives and deflects light from the second path, and
        an imaging optic that directs the deflected light into a sample and receives light that emanates from the sample, wherein one or more of the first optical relay and the second optical relay is configured to image the lens to a pupil plane of the imaging optic; and
    a detector that receives the light that emanates from the sample from the imaging optic.

2. The system of claim 1, wherein the optical element comprises a polarizing beam splitter.

3. The system of claim 1, wherein the first optical relay is in the second path, and the second optical relay is positioned to receive light that is deflected by the scanner.

4. The system of claim 3, wherein
    each of the first and second optical relays comprise two lenses that are arranged as a 4f system, and
    the two 4f systems are configured to image the lens to the pupil plane of the microscope objective.

5. The system of claim 3, wherein the scanner comprises a galvanometer scanner.

6. The system of claim 5, wherein the scanner is a resonant galvanometer scanner.

7. The system of claim 5, wherein the scanner is a non-resonant galvanometer scanner.

8. The system of claim 1, wherein the scanner comprises a movable mirror that deflects the light.

9. The system of claim 1, wherein the detector comprises a photomultiplier tube.

10. The system of claim 1, further comprising a data acquisition system that receives data from the detector, the data comprising a representation of an amount of light received at the detector, and the data acquisition system comprising:
    one or more electronic processors, and
    instructions stored on a computer-readable medium, the instructions, when executed by the one or more electronic processors, causing the data from the detector to be processed into a three-dimensional representation of the sample.

11. The system of claim 1, wherein the light emanating from the sample is a laser-excited signal.

12. The system of claim 11, wherein the laser-excited signal comprises two-photon excited fluorescence.

13. The system of claim 1, wherein one of the first and second optical relays is in the first path between the reflective element and the lens, and the one of the first and second optical relays that is in the first path is configured to image the reflective element onto the lens and to image the lens onto the reflective element.

14. A system for a laser-scanning microscope, the system comprising:
    an optical element that transmits light of a first polarization onto a first path and reflects light having a second polarization onto a second path;
    a quarter-wave plate in the first path;
    a lens comprising a focal length that is adjustable during use of the lens;
    a reflective element in the first path, the reflective element positioned to receive light from and reflect light toward one or more of the quarter-wave plate and the lens; and
    an optical relay configured to image the lens to a pupil plane of an imaging objective of the laser-scanning microscope, wherein the lens is between the reflective element and the quarter-wave plate.

15. The system of claim 14, wherein the lens comprising a focal length that is adjustable during use of the lens comprises a medium that has an index of refraction that is adjusted by applying a sonic signal to the medium.

16. The system of claim 15, further comprising a continuous wave optical source.

17. The system of claim 16, further comprising:
a detector configured to measure an amount of optical power in the second path, the amount of power being related to the focal length of the lens, and
a phase locked loop that receives an indication of the measured amount of optical power from the detector and provides a signal based on the indication of the measured amount of optical power to the lens on the first path, the provided signal being sufficient to change the focal length of the lens.

18. The system of claim 14, further comprising a feedback system comprising one or more electronic processors and a non-transitory computer-readable medium comprising instructions that, when executed, cause the one or more electronic processors to:
receive a signal that represents an amount of focusing of the lens, and
change the focal length of the lens based on the received signal.

19. The system of claim 14, wherein
the lens is in the first path,
the reflective element is positioned to receive light from and reflect light toward the lens and the quarter-wave plate, and
the lens is between the reflective element and the quarter-wave plate such that light received at the reflective element from the quarter-wave plate passes through the lens, and light reflected from the reflective element toward the quarter-wave plate passes through the lens.

* * * * *